Jan. 13, 1942.    A. B. CHRISTOPHER    2,269,436
ASBESTOS-CEMENT PIPE
Filed Aug. 3, 1940    2 Sheets-Sheet 1
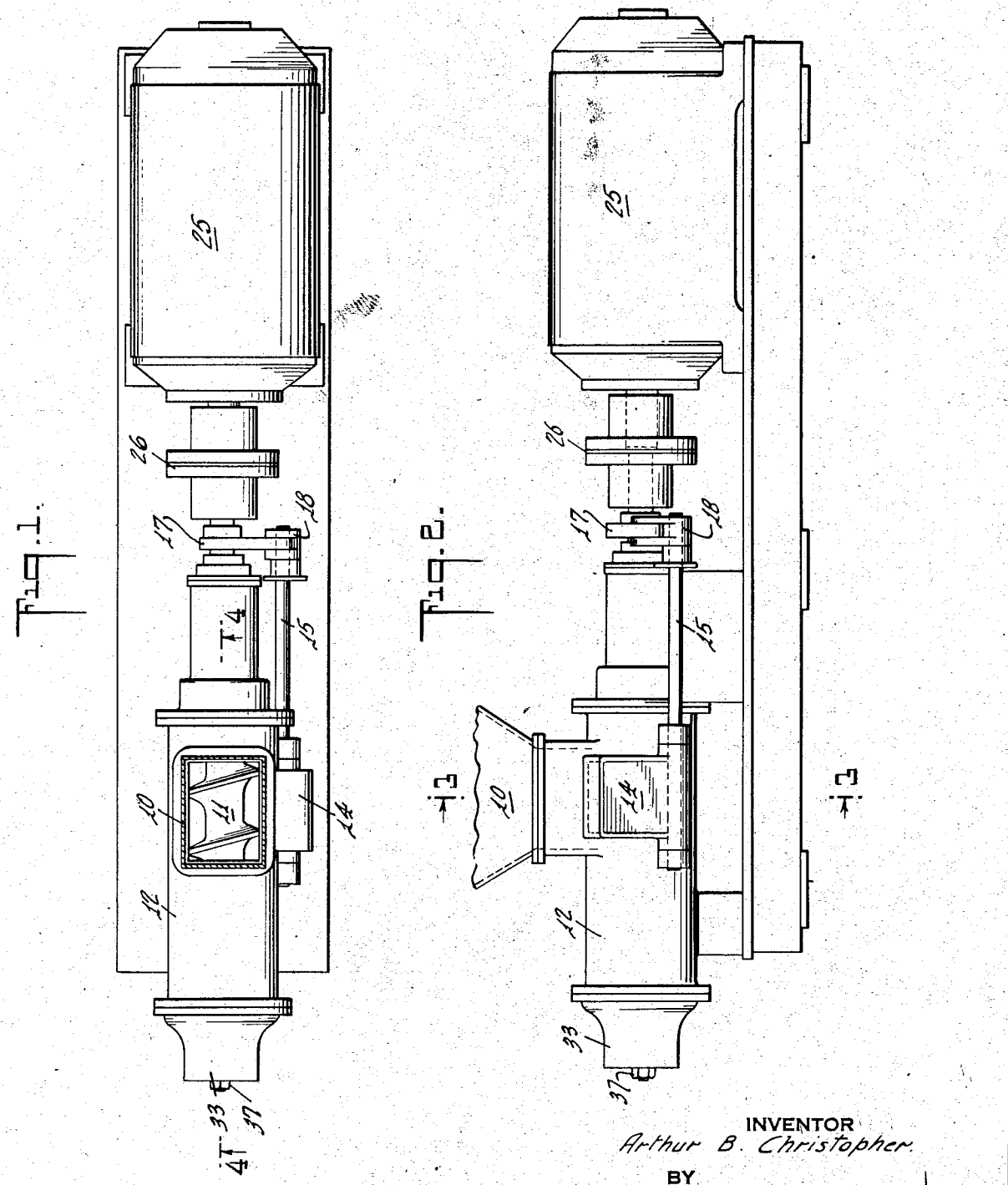
INVENTOR
Arthur B. Christopher
BY
ATTORNEY Jan. 13, 1942.  A. B. CHRISTOPHER  2,269,436
ASBESTOS-CEMENT PIPE
Filed Aug. 3, 1940  2 Sheets-Sheet 2
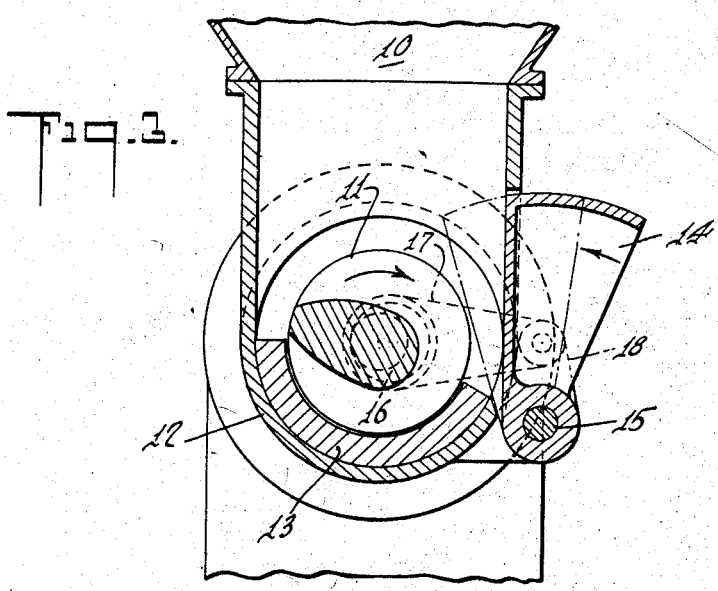
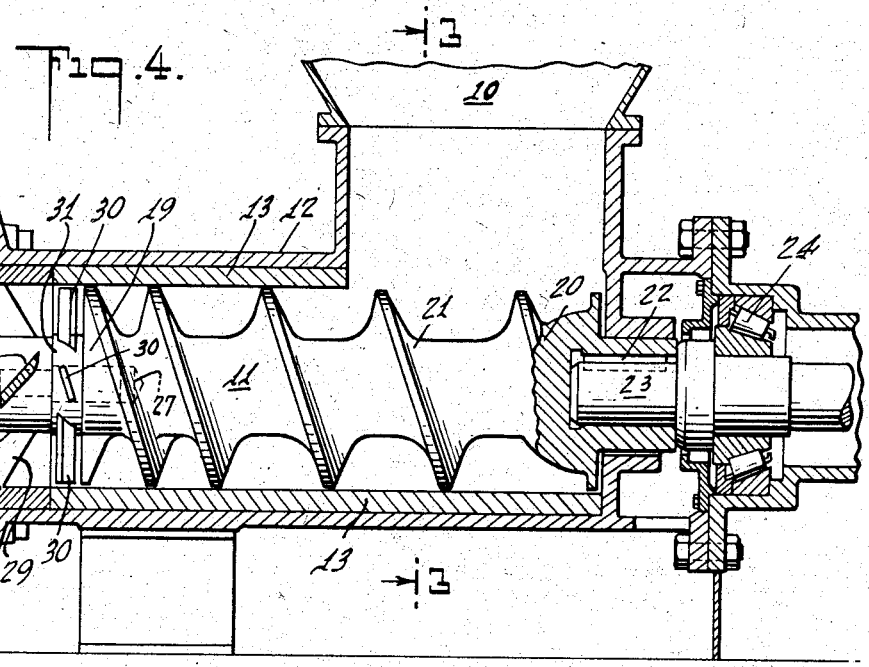
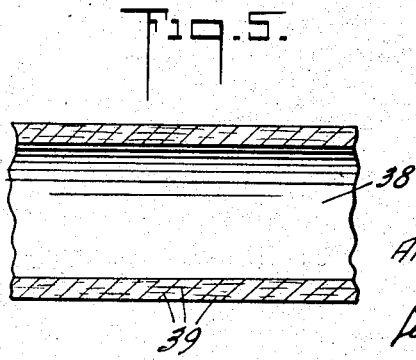
INVENTOR
Arthur B. Christopher.
BY
ATTORNEY Patented Jan. 13, 1942

2,269,436

UNITED STATES PATENT OFFICE 2,269,436

ASBESTOS-CEMENT PIPE

Arthur B. Christopher, Audubon, N. J., assignor to The Ruberoid Co., New York, N. Y., a corporation of New Jersey Application August 3, 1940, Serial No. 350,372

3 Claims. (Cl. 138—80)

This invention relates to an asbestos-cement pipe, and more particularly to a pressure pipe for use in conducting water or other liquid under high pressure.

The principal object of the invention is to provide an extruded asbestos-cement pipe of great structural strength and maximum density having smooth and straight exterior and interior surfaces of uniform diameter throughout, which pipe is formed of a homogeneous plastic cement composition reenforced throughout its length and thickness with fibers that extend substantially in the direction of the longitudinal axis of the pipe.

In the practice of my invention, I employ a composition of plastic consistency comprising a mixture of hydraulic cement, such as Portland cement, asbestos fibers, and water, with or without fillers or inert material.

A mass of the plastic material is fed under substantially constant pressure and at a substantially uniform rate of flow through a stationary die by which it is shaped into tubular form. During its passage through the die the mass is compressed or compacted to a high degree to integrate and unite the cement particles and the fibers into a homogeneous body of maximum density.

An important feature of the invention consists in providing an asbestos-cement pipe in which the fibers extend in a direction substantially parallel to the longitudinal axis of the extruded pipe.

Extruded asbestos-cement pipes made according to this invention may be formed in continuous sections of any desired lengths having uniformly straight bores and outer surfaces. Because of the fact that the fiber reenforcement extends lengthwise of the pipes, they are found to be much stronger in respect to bursting strength than similar pipes of equal wall thickness in which the fibers extend spirally or circumferentially. My reenforced pipe will have a bursting strength of from two to four times its normal working pressure for any given wall thickness.

The invention permits of the use of shorter and cheaper fibers than are used in pipes produced by winding sheet material on a mandrel, and accordingly I am able to produce at low cost pressure pipes of exceptional strength. Short asbestos fibers of the character commonly known as "S" or shingle fibers may be used satisfactorily.

The pipe is formed with smooth surfaces, both inside and out, and therefore does not require any subsequent machining or finishing operation. Because of its smooth bore, the pipe has a very low co-efficient of resistance to the flow of liquid. The smooth outer surface and controlled wall thickness facilitates the union of the sections of the pipe with the use of conventional couplings without the necessity of machining or lathing.

A further advantage of the pipe is that it is highly resistant to corrosion from external influences, and to corrosion or erosion from the flow of liquid therethrough.

The invention is illustrated diagrammatically in the drawings in which:

Figure 1 is a top plan view of an extrusion machine for making the pipe;

Fig. 2 is a side elevation of the machine;

Fig. 3 is a vertical cross-section through the hopper, taken on the line 3—3 of Figs. 2 and 4;

Fig. 4 is a fragmental longitudinal section taken on the line 4—4 of Figure 1; and Fig. 5 is a longitudinal sectional view of a fragment of the pipe showing the position of the fibers.

The pipe is made of a plastic fibro-cement mixture composed principally of Portland cement containing from about 10% to 20% by weight of unopened spicules or bundles of relatively short asbestos fibers, such as are commonly known as shingle fibers, with or without the addition of suitable inert materials and fillers. Water is added to the mixture in sufficient quantity to form a moist, as distinguished from a wet, mass of plastic consistency.

The material is placed into the hopper 10 of the machine from which it is fed to the auger or screw 11 mounted to rotate in the barrel or casing 12 which is preferably provided with a detachable liner 13. The hopper is equipped with a feeding device, as best seen in Fig. 3, that operates to tamp the material into the channel 21 of the auger. This feeding device comprises a pusher or tamper 14 which is disposed at one side of the hopper and fixed to a rock-shaft 15 that is rocked by an eccentric 16 through an arm 17 and crank 18.

The rear end 20 of the auger is keyed at 22 to a rotary shaft 23. The shaft 23 is supported at two or more spaced points on suitable thrust-bearings 24, of which only one set is shown, and is driven through a coupling 26 by means of an electric motor and reduction gear (not shown)

housed in the casing 25, although any other suitable driving means may be used.

The front end 19 of the auger is supported on a cylindrical bearing 27 secured to a spider 28. The spider has a plurality of arms 29, generally four, which are preferably arched to assist in resisting the thrust caused by extrusion of the material, and which are placed at substantially the angle at which the material comes off the auger and are of such design as to cause the thinnest possible cut in the material consistent with the required strength of the spider construction.

The auger tends to extrude the material in a swirl or worm with a spiral orientation of the fibers. This has been found to be objectionable. To overcome this disadvantage, I equip the machine with placer blades 30, generally three or four, mounted on a sleeve or collar 31 fixed to the front end 19 of the auger to rotate with the auger. The blades are pitched at a suitable angle to the axis of rotation of the auger, or they may be constructed as to permit of adjustment of the pitch, to direct the fibers longitudinally and to distribute the material uniformly in the enlarged entrance chamber 32 of the expressing-die 33. The blades are so timed and spaced that they miss the flights of the auger, and they may be disposed either in back or in front of the spider 28. I prefer however to place them in back of the spider, as shown in the drawings.

Chamber 32, as will be seen on reference to Fig. 4, has convex walls curving from the discharge end of the auger to the tube forming portion of the die, and is shaped to compress the material in its passage into the die. The opening into the chamber is considerably larger than its exit, generally about three to four times as large. Due to the combined action of the feed of the auger and the constricted shape of the chamber, a mass of material will be gathered in the chamber and densely compacted so as to be free of voids by the pressure built up therein. In passing between the arms 29 of the spider the material is divided into sections. However, these sections are united and knit together when the material is subjected to compression in the chamber.

The die 33 is attached by bolts 34 or other fastening means to the front end of the casing 12. Concentrically disposed within the die is a stationary core 35. The core is supported so that it cannot wabble on a rod 36 fixed to the spider 28. A nut 37 on the threaded end of the rod permits of detaching the core. Upon detaching the die the spider 28 may be slid out of the front end of the casing to permit of demounting and replacing the auger. Dies and cores of different sizes may be used interchangeably on the machine to form pipes of different diameters and wall thicknesses.

The compacted asbestos-cement material by being forced through the space between the stationary die and core members is extruded in a uniformly straight tube of predetermined diameter and thickness, having smooth exterior and interior surfaces, and free from kinks, dents or bulges.

The extruded pipe 38, shown in Fig. 5, comprises a tubular body of cement reenforced throughout with asbestos fibers 39 that run lengthwise, substantially parallel to the longitudinal axis of the pipe, and that are firmly embedded and bonded in the cement.

As extruded, the pipe is sufficiently self-sustaining that it may be cut into lengths and handled without deformation. The cut lengths may be set in any usual manner, which setting may be accelerated by use of an autoclave.

The extrusion process and apparatus shown and described herein are claimed in a companion application, Serial Number 350,373 of August 3, 1940, filed by me. The present application relates to the extruded pipe, and it is to be understood that in making the pipe other suitable extrusion apparatus may be used.

I claim:

1. As a new article of manufacture, an extruded asbestos-cement pipe composed of a hardened plastic mixture of cement and asbestos fiber in which substantially all the fibers are mechanically arranged during extrusion to run lengthwise of the pipe.

2. As a new article of manufacture, an extruded asbestos-cement pipe composed of a hardened plastic cement mixture containing not more than about 20% by weight of asbestos fibers distributed substantially uniformly throughout and in which the fibers are mechanically directed during extrusion to extend substantially lengthwise of the pipe.

3. An asbestos-cement pressure pipe of high bursting strength formed of an extruded, compacted mixture of cement reenforced with from about 10% to 20% by weight of short asbestos fibers, in which the fibers are mechanically directed during extrusion to extend substantially lengthwise of the pipe and are uniformly distributed throughout, said pipe having a straight and smooth tubular wall, of uniform thickness, and of constant inner and outer diameters, throughout its entire length.

ARTHUR B. CHRISTOPHER.